Oct. 28, 1924.

F. S. McCULLOUGH 1,513,713

ELECTRICALLY HEATED UTENSIL

Filed Oct. 8, 1923

INVENTOR
Frederick S. McCullough
by C. M. Clarke
Atty.

Patented Oct. 28, 1924.

1,513,713

UNITED STATES PATENT OFFICE.

FREDERICK S. McCULLOUGH, OF WILKINSBURG, PENNSYLVANIA.

ELECTRICALLY-HEATED UTENSIL.

Application filed October 8, 1923. Serial No. 667,111.

*To all whom it may concern:*

Be it known that I, FREDERICK S. McCULLOUGH, a citizen of the United States, residing at Wilkinsburg, in the county of Allegheny and State of Pennsylvania, have invented certain new and useful Improvements in Electrically-Heated Utensils, of which the following is a specification.

This invention is for an improvement in electrical heating devices, such as soldering irons, sad-irons, and various other electrically heated utensils or implements.

Present types of electrically heated utensils and implements are found in commercial use to-day, but a difficulty common to them all is that the heating element, if allowed to reach a high temperature, will oxidize and burn out. For this reason, it is frequently necessary, for instance, to renew the resistance element of a sad-iron or electric iron. Furthermore, due to the same cause, the range of temperatures is quite limited and the resistance element does not give the maximum efficiency for the current consumed.

The present invention has for its object to provide a utensil wherein oxidation of the heating element is prevented, so that the heating element is not liable to burn out. Furthermore, the filament may be of a nature which may operate at relatively high temperatures and give greater efficiency. The range of utility of certain heating devices may also be widened by the application of my invention.

According to my invention, the interior of the utensil or implement, whatever it may be, in which the heating unit is contained, is evacuated to remove practically all of the oxygen, after which it may be sealed. Instead of being sealed in an evacuated condition, it may first be filled with an inert gas, such as nitrogen.

Figure 1:
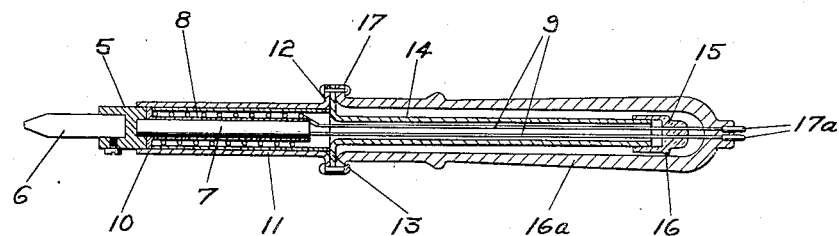
Figure 2:
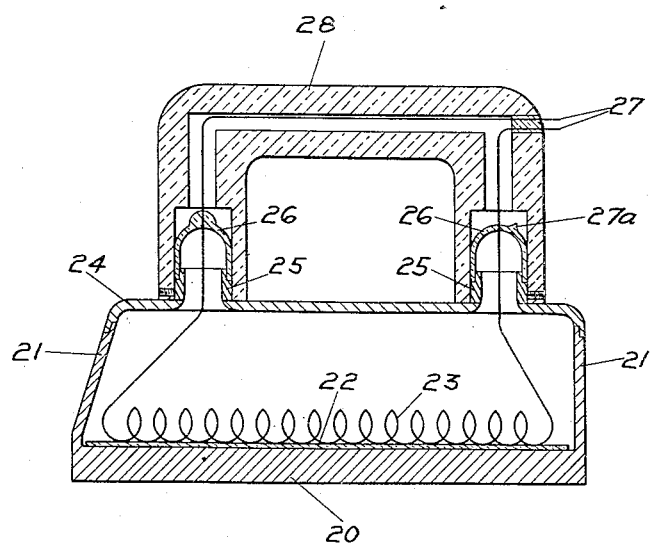

The invention may be readily understood by reference to the accompanying drawings, in which:

Fig. 1 is a longitudinal section through a soldering iron embodying my invention; and Fig. 2 is a similar section through a sad-iron.

The two figures shown are merely illustrative of the invention and I do not confine myself to the particular structure shown, nor do I limit the application of the inventions to the specific implements or utensils.

In Fig. 1, 5 designates a relatively heavy heat retaining body, in which is a removable or replaceable working member 6 which, as shown, may be a soldering tool. On the body is a longitudinal extension 7 surrounded by a close fitting refractory tube 8. Wrapped around the exterior of the tube 8, which is also an insulator, is a resistance unit in the form of a relatively small wire. Opposite ends of this wire are connected with lead in wires 9. Surrounding the outside of the heating wire may be mica insulation.

Welded to the body 5 at 10 is a metal tube 11 which surrounds the unit. This tube has a flanged upper end 12. The flange 13 of a second tube 14 of copper is welded or soldered to flange 12. Melted onto the upper open end of tube 14 is a glass seal 15 through which the lead wires 9 are passed.

The structure, when thus far completed, is put on a vacuum pump, the tube to the pump being connected at point 16 where the glass seal is indicated as being "tipped off." After all appreciable quantities of air have been exhausted, the seal may be tipped off, leaving the interior of the tube in a state of high exhaustion. If desired, the tube may be filled with an inert gas, such as nitrogen, before being tipped off.

In either case, the resistance wire is effectively protected from oxidation, the entire interior of the chamber being air tight.

A handle 16ª may be fitted over the tube 14, the handle having a flange 17 on its lower end, through which pass screws or bolts that pass through the double flange 12—13, care being taken that the holes for the screws or bolts are so placed as not to admit air to the chamber inside the tool. Connecting plugs 17ª may be provided on the handle to which the leads 9 connect.

Fig. 2 shows the principle of my invention applied to a sad-iron. In this figure, which is somewhat diagrammatic, 20 designates the relatively heavy base for retaining heat and conducting it to the work to be ironed. The base has flanges 21 extending upwardly therefrom.

On the upper face of the bottom member is heat resisting insulation 22 on which the heating wire or unit 23 is supported. Welded onto the flanges 21 is a cover 24, which may be applied after the heating unit is installed in the base. The cover may have one or more copper tubes 25 welded thereto opening into the interior of the iron. I have shown two such tubes for purposes of illustration. Melted onto the copper and adhering thereto are glass seals 26, one of the lead wires 27 to the coil passing through each seal.

The chamber is exhausted in manufacture by a pump, the tip 27ª indicating where the seal was tipped off after exhaustion. The chamber may, if desired, be filled with nitrogen instead of remaining evacuated. The shell, of course, must be air tight at every point.

The handle for the iron is designated 28, and the lead wires may, as shown, extend through the handle.

In every event where the glass seals are used in the utensils, particular care should be taken to protect the seals from breakage.

The two embodiments shown and described are believed to illustrate how my invention may be applied to various electrically heated devices or utensils. With the invention, a substance not heretofore practical for resistance elements of this kind, such for instance as molybdenum, may be advantageously used.

I claim as my invention:

1. An electrically heated utensil comprising a metal body, an air-tight chamber in the body, an electrical heating element in the chamber, and a glass seal for the chamber fused on to the metal, said chamber having the oxygen removed therefrom.

2. An electrically heated utensil comprising a metal body having a working surface for applying heat to other objects, an air-tight chamber in the body, a glass seal for the chamber melted onto a part of the body, an electrical heating element within the chamber, and a conductor passing through the seal to the heating element, said chamber having the oxygen evacuated therefrom.

3. An electrically heated utensil comprising a metal heat applying body, an air-tight chamber therein, electric heating means in the chamber, a copper tube leading from the chamber, and a glass seal for the tube and chamber, said chamber being substantially free of oxygen.

4. An electrically heated utensil comprising a metal body, an air-tight chamber in the body, an electrical heating unit in the chamber, a glass seal for the chamber, said chamber being substantially free of any oxidizing agent, and means outside the body for protecting the glass seal.

5. An electrically heated utensil comprising a composite body made of a plurality of metal sections, a chamber in the body, said sections being so united as to be air-tight, a heating element within the chamber arranged to heat said body, said chamber being substantially free of oxygen, and an air-tight glasseous seal for the chamber through which exhaustion of oxygen is effected.

6. An electrically heated utensil comprising a body, a working tool on the body, a metal extension on the body, heat resisting insulation around the extension, a heating wire around the insulation, a tube having an air-tight connection with the body surrounding the extension, and a glass seal for the tube, said tube having the oxygen removed therefrom, whereby oxidation of the heating wire is prevented.

In testimony whereof I hereunto affix my signature.

FREDERICK S. McCULLOUGH.